US007412369B1

(12) United States Patent
Gupta

(10) Patent No.: US 7,412,369 B1
(45) Date of Patent: Aug. 12, 2008

(54) SYSTEM AND METHOD FOR DESIGNING AND OPTIMIZING THE MEMORY OF AN EMBEDDED PROCESSING SYSTEM

(75) Inventor: Vidyabhusan Gupta, Palo Alto, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 1099 days.

(21) Appl. No.: 09/591,621

(22) Filed: Jun. 9, 2000

(51) Int. Cl.
*G06F 17/50* (2006.01)
(52) U.S. Cl. .............................. 703/14; 703/1; 703/13; 703/20
(58) Field of Classification Search .................. 703/14, 703/21, 23, 26, 27, 28, 13, 17, 20, 1; 711/170, 711/100; 365/230.03; 714/763
See application file for complete search history.

(56) References Cited

U.S. PATENT DOCUMENTS

| 6,052,524 | A * | 4/2000 | Pauna .................... 395/500.43 |
| 6,263,302 | B1 * | 7/2001 | Hellestrand et al. ........... 703/17 |
| 6,604,067 | B1 * | 8/2003 | Abraham et al. .............. 703/21 |

OTHER PUBLICATIONS

T Vinod Kumar Gupta & Purvesh Sharma. "Processor Evaluation in an Embedded Systems Design Environment B. Tech Project." May 1999 Deparment of Computer Science & Engineering Indian Institute of Technology, Delhi.*
T.V.K. Gupta, Purvesh Sharma, M. Balakrishnan & Sharad Malik. "Professor Evaluation in an Embedded Systems Design Environment.", Jan. 2000, VLSI Design 2000, 13th Annual International Conference.*
Barry Shackleford , Mitsuhiro Yasuda, Etsuko Okushi, Hisao Koizumi, Hiroyuki Tomiyama & Hiroto Yasuura. "Memory-CPU size optimization for embedded system designs." 1997 Annual ACM IEEE Design Automation Conference.*
J. Takala, M. Kuulusa, P. Ojala & J. Nurmi. "Enhanced DSP core for embedded applications." Signal Processing Systems, 1999. SiPS 99. 1999 IEEE Workshop on , Oct. 20-22, 1999.*
Gupta, T.V.K.; Sharma, P.; Balakrishnan, M.; Malik, S.; "Processor evaluation in an embedded systems design environment", VLSI Design, 2000. Thirteenth International Conference on , Jan. 3-7, 2000, pp. 98-103.*
Panda, P.R.; Dutt, N.D.; Nicolau, A.; "Local memory exploration and optimization in embedded systems", Computer-Aided Design of Integrated Circuits and Systems, IEEE Transactions on, vol. 18 , Issue: 1 , Jan. 1999, pp. 3-13.*

(Continued)

*Primary Examiner*—Kamini S Shah
*Assistant Examiner*—Herng-der Day
(74) *Attorney, Agent, or Firm*—Lisa K. Jorgenson; William A. Munck

(57) ABSTRACT

There is disclosed an apparatus for designing and optimizing a memory for use in an embedded processing system. The apparatus comprises: 1) a simulation controller for simulating execution of a test program to be executed by the embedded processing system; 2) a memory access monitor for monitoring memory accesses to a simulated memory space during the simulated execution of the test program, wherein the memory access monitor generates memory usage statistical data associated with the monitored memory accesses; and 3) a memory optimization controller for comparing the memory usage statistical data and one or more predetermined design criteria associated with the embedded processing system and, in response to the comparison, determining at least one memory configuration capable of satisfying the one or more predetermined design criteria.

16 Claims, 2 Drawing Sheets

OTHER PUBLICATIONS

Prete, C.A.; Graziano, M.; Lazzarini, F.; "The ChARM tool for tuning embedded systems", Micro, IEEE, vol. 17, Issue: 4, Jul.-Aug. 1997, pp. 67-76.*

Abraham, S.G.; Mahlke, S.A.; "Automatic and efficient evaluation of memory hierarchies for embedded systems", Microarchitecture, 1999. Micro-32. Proceedings. 32nd Annual International Symposium on, Nov. 16-18, 1999, pp. 114-125.*

Gries, M.; "The impact of recent DRAM architectures on embedded systems performance", Euromicro Conference, 2000. Proceedings of the 26th , vol. 1 , Sep. 5-7, 2000, pp. 282-289 vol. 1.*

Kuulusa, M.; Nurmi, J.; Takala, J.; Ojala, P.; Herranen, H.; "A flexible DSP core for embedded systems", Design & Test of Computers, IEEE, vol. 14 , Issues: 4 , Oct.-Dec. 1997, pp. 60-68.*

Shackleford, B.; Yasuda, M.; Okushi, E.; Koizumi, H.; Tomiyama, H.; Yasuura, H.; "Memory-CPU Size Optimization For Embedded System Designs", Design Automation Conference, 1997. Proceedings of the 34th, Jun. 9-13, 1997, pp. 246-251.*

Danckaert, K.; Catthoor, F.; De Man, H.; "System level memory optimization for hardware-software co-design", Hardware/Software Codesign, 1997. (Codes/Cashe '97), Proceedings of the Fifth International Workshop on, Mar. 24-26, 1997, pp. 55-59.*

Halambi, A.; Grun, P.; Ganesh, V.; Khare, A.; Dutt, N.; Nicolau, A.; "Expression: a language for architecture exploration through compiler/simulator retargetability", Design, Automation and Test in Europe Conference and Exhibition 1999. Proceedings, Mar. 1999.*

Sudhakar, P. Rama; Kumar, Shashi; "Specification of Architecture Template for Embedded System Design", Department of Computer Science and Engineering Indian Institute of Technology, Deli; Dec. 1999.*

Progress Report for "Asset: Automated SynthesiS of Embedded Systems A methodology for Heterogenous Implementations of Real Time Embedded Systems for Vision/Image Processing", Department of Computer Science and Engineering Indian Institute of Technology.*

Catthoor, F.; Dutt, N.D.; Kozyrakis, C.E.; "How to solve the current memory access and data transfer bottlenecks: at the processor architecture or at the compiler level?", Design, Automation and Test in Europe Conference and Exhibition 2000. Proceedings.*

Panda, P.R.; Dutt, N.D.; Nicolau, A.; "Architectural exploration and optimization of local memory in embedded systems", System Synthesis, 1997. Proceedings., Tenth International Symposium on, Sep. 17-19, 1997, pp. 90-97.*

Giorgi et al., "An Educational Environment for Program Behavior Analysis and Cache Memory Design", 1997 Frontiers in Education Conference, Proceedings of Teaching and Learning in an Era of Change, 1997, vol. 3, pp. 1243-1248.*

Coumeri et al., "Memory Modeling for System Synthesis", Proceedings of 1998 International Symposium on Low Power Electronics and Design, Aug. 1998, pp. 179-184.*

Magnusson et al., "Efficient Memory Simulation in SimICS", Proceedings of the 28th Annual Simulation Symposium, Apr. 1995, pp. 62-73.*

* cited by examiner

SYSTEM AND METHOD FOR DESIGNING AND OPTIMIZING THE MEMORY OF AN EMBEDDED PROCESSING SYSTEM

TECHNICAL FIELD OF THE INVENTION

The present invention is generally directed to memory design applications and, more specifically, to a system design tool capable of determining the memory access usage of an embedded processing system and selecting and optimizing the types and sizes of memories used in the embedded processing system.

BACKGROUND OF THE INVENTION

The demand for high-performance processing devices requires that state-of-the-art integrated circuits perform operations in the minimum amount of time, consume the minimum amount of power, and occupy the smallest amount of die space possible. This is particularly true of a wide array of embedded processing systems, such as application-specific integrated circuit (ASIC) devices, that contain a processor and memory. ASIC devices and other embedded processing systems are used in network cards, modems, wireless receivers and transmitters, smart cards, cell phones, personal digital assistant (PDA) devices, and the like.

In normal software development efforts for an embedded processing system, a compiler is used to generate the appropriate object code from the source code that the programmer has written. In general, conventional compiler technology has evolved to allow the user to select the quality of the code that is generated (e.g., compilers have compilation switches that allow either independent or linked optimization of the code for space and time). Generally, object code that is optimized for space (i.e., low memory requirements) runs slower than object code that has been optimized for time (i.e., can use as much memory as necessary).

Circuit designers frequently make trade-offs when designing embedded processing systems. One major issue that must be resolved when designing an ASIC device or other embedded processing system is the amount of embedded memory that will be available in the system. Because a memory circuit can be expensive in terms of space, power consumption, and speed, it is important to optimize the embedded memory to minimize these costs while retaining as much flexibility as possible.

Several different types of memories may be used in modern embedded ASIC devices. These memories include SRAM, DRAM, flash RAM, EEPROM, flip-flops, and ROM. Each of these memories has different characteristics that make the memory more suitable or less suitable for a particular application. Unfortunately, while modern design tools, such as compilers and debuggers, are capable of telling circuit designers the total amount of memory needed, they tell very little else about the memory requirements of an ASIC device. The software designers who write the code executed by the ASIC device tend to treat all memory the same and do not write code in a manner that exploits the characteristics of different types of memories. The end result is that many ASIC devices run slower, consume more power, or are larger in size than would otherwise have been necessary.

Therefore, there is a need in the art for improved apparatuses and methods for designing embedded processing systems. In particular, there is a need for embedded processing system design tools that are capable of determining the memory access usage of an application executed by an embedded processing system that is under design. More particularly, there is a need for embedded processing system design tools that are capable of selecting and optimizing the types and sizes of memories used in the target device and optimizing the application program code executed by the target device to exploit the characteristics of the different types of available memories.

SUMMARY OF THE INVENTION

To address the above-discussed deficiencies of the prior art, it is a primary object of the present invention to provide an apparatus for designing and optimizing a memory for use in an embedded processing system. In an advantageous embodiment of the present invention, the apparatus comprises: 1) a simulation controller capable of simulating execution of a test program to be executed by the embedded processing system; 2) a memory access monitor capable of monitoring memory accesses to a simulated memory space during the simulated execution of the test program, wherein the memory access monitor is capable of generating memory usage statistical data associated with the monitored memory accesses; and 3) a memory optimization controller capable of comparing the memory usage statistical data and one or more predetermined design criteria associated with the embedded processing system and, in response to the comparison, determining at least one memory configuration capable of satisfying the one or more predetermined design criteria.

According to one embodiment of the present invention, the at least one memory configuration is determined from a predetermined set of memory types, the predetermined set of memory types comprising at least two of static random access memory (SRAM), dynamic random access memory (DRAM), read-only memory (ROM), flash RAM (FLASH), and electronically erasable programmable read-only memory (EEPROM).

According to another embodiment of the present invention, the at least one memory configuration comprises a first memory type and a first memory size associated with the first memory type.

According to still another embodiment of the present invention, the at least one memory configuration further comprises a second memory type and a second memory size associated with the second memory type.

According to yet another embodiment of the present invention, the simulation controller simulates execution of the test program N times and wherein the memory access monitor monitors the memory accesses during the N simulated executions of the test program and generates the memory usage statistical data based on the N simulated executions of the test program.

According to a further embodiment of the present invention, the memory optimization controller is further capable of determining at least one figure of merit associated with the at least one memory configuration, wherein the at least one figure of merit indicates a degree to which the at least one memory configuration satisfies the one or more predetermined design criteria.

According to a still further embodiment of the present invention, the apparatus further comprises a code optimization controller capable of modifying the test program in response to the comparison of the memory usage statistical data and the one or more predetermined design criteria to thereby enable the embedded processing system to execute the test program according to the one or more predetermined design criteria.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
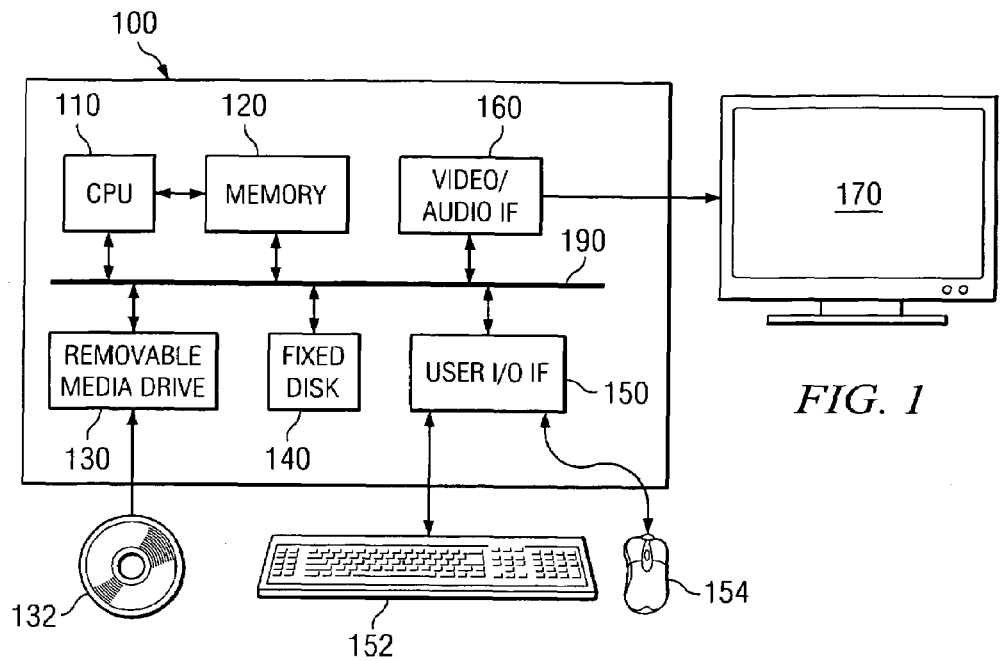
FIG. 1 illustrates an exemplary processing system capable of determining the memory requirements of an embedded system under design according to one embodiment of the present invention.
Figure 2:
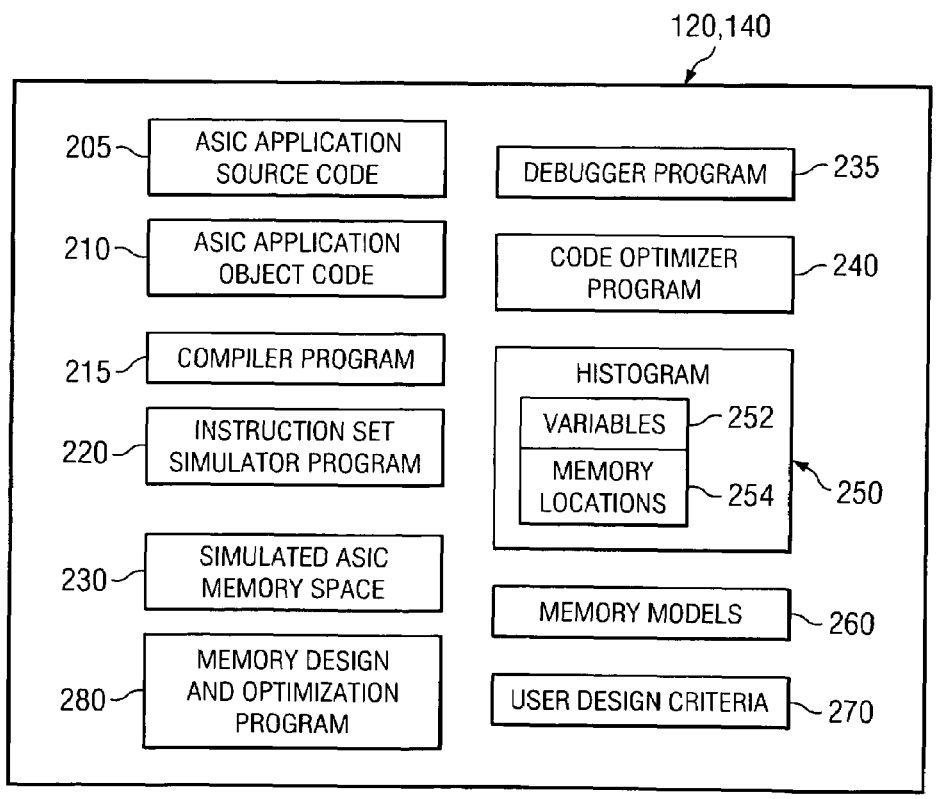
FIG. 2 illustrates in greater detail memory design and optimization application programs that may be stored in the fixed disk drive and executed from the memory in FIG. 1 according to one embodiment of the present invention.
Figure 3:
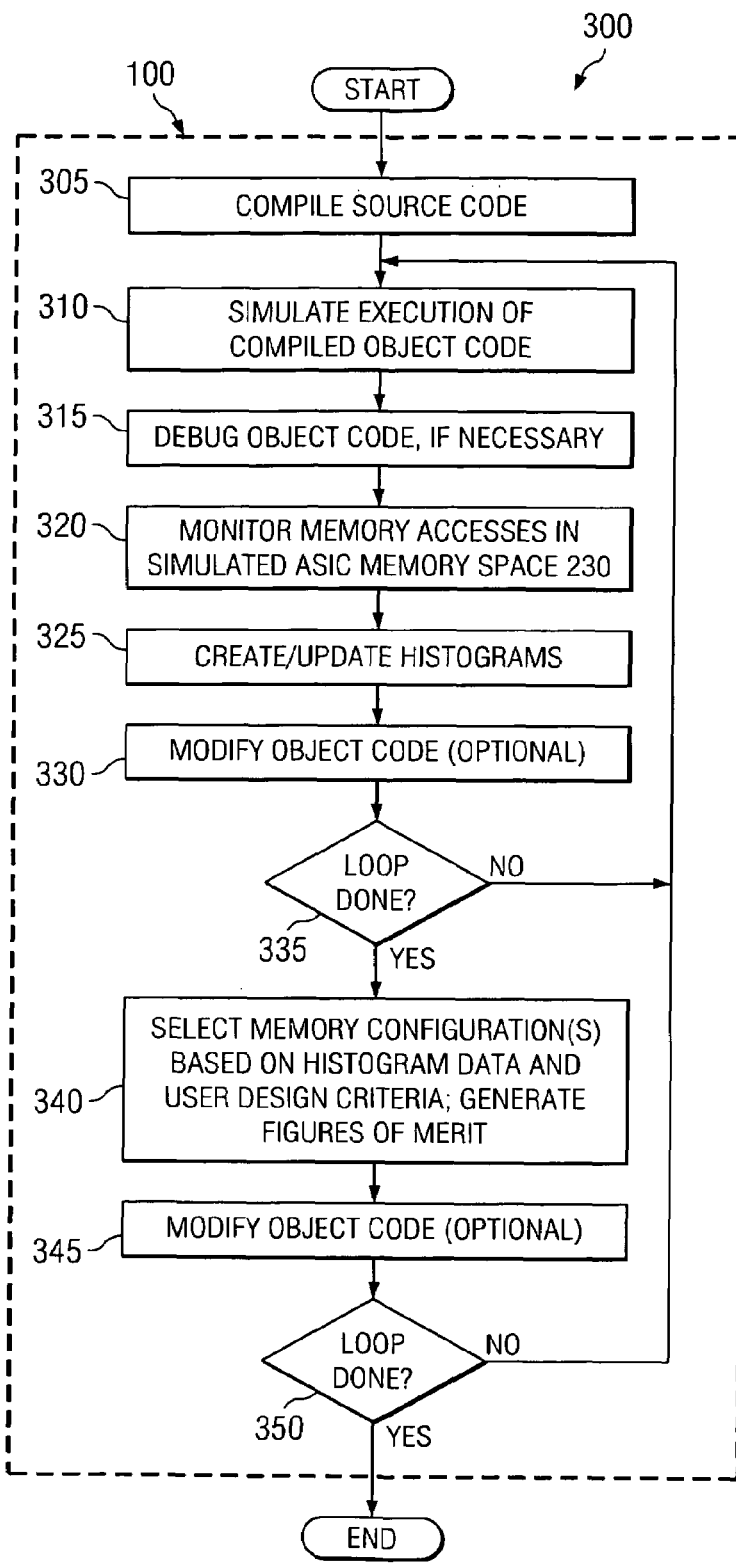
FIG. 3 is a flow diagram illustrating the operation of the exemplary processing system according to one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged processing system.

FIG. 1 illustrates exemplary processing system 100, which is capable of designing and optimizing the memory of an embedded system, such as an application specific integrated circuit (ASIC), according to one embodiment of the present invention. In an advantageous embodiment, processing system 100 may be embodied in a personal computer (PC) or equivalent workstation (as shown in FIG. 1) that contains a processor and memory capable of executing memory design applications and/or memory optimization applications according the principles of the present invention.

Processing system 100 comprises data processor (CPU) 110, memory 120, removable media drive 130, fixed (i.e., "hard") disk drive 140, user input/output (I/O) interface (IF) 150, keyboard 152, mouse 154 (or similar pointing device), video/audio interface (IF) 160 and monitor 170. Memory 120 may comprise volatile memory, such as dynamic random access memory (DRAM), non-volatile memory, such as flash RAM, or a combination of volatile and non-volatile memory. Removable media drive 130 may be any type of storage device that is capable of reading from and/or writing to a removable storage medium, such as a 3.5 inch floppy diskette, a CD-ROM, a writable CD, a digital versatile disk (DVD), or the like. A removable storage medium, such as CD-ROM 132, may be used to load onto fixed disk 140 application programs and data, including the memory optimization application programs explained below. Fixed disk drive 140 provides fast access for storage and retrieval of application programs and data, including stored memory optimization application programs according to the principles of the present invention.

Keyboard 152 and mouse 154 are coupled to processing system 100 via user I/O IF 150. An embedded processing systems designer uses keyboard 152 and mouse 154 to control the operation of memory design/optimization applications embodying the principles of the present invention and to enter data used by those applications, such as user design criteria and memory models (described below in greater detail). Monitor 170 is coupled to processing system 100 via video/audio IF 160. The internal components of processing system 100, including CPU 110, memory 120, removable media drive 130, fixed disk drive 140, user I/O IF 150, and video/audio IF 160 are coupled to and communicate across internal communication bus 190.

In an advantageous embodiment of the present invention, a memory design and optimization apparatus according to the principles of the present invention may comprise a controller that is implemented using a conventional data processor (i.e., CPU 110) that executes one or more memory design and optimization application programs stored in memory 120 and fixed disk drive 140. Since the memory design and optimization application programs and associated data files may be transferred into memory 120 from a removable storage medium, the present invention may be implemented as memory design and optimization application programs and associated data files stored on, for example, CD-ROM 132.

FIG. 2 illustrates in greater detail memory design and optimization application programs and data files that may be executed from and stored in memory 120 (and stored in fixed disk drive 140) according to one embodiment of the present invention. The memory design and optimization application programs in memory 120 are design tools that software and hardware designers may use to determine the optimum memory requirements of an exemplary ASIC device (occasionally referred to hereafter as the "target" device) that is being designed. Processing system 100 simulates the execution of the object code executed by the target device and then determines the types and amounts of memories that may be used in the target device in order to meet certain user-specified design criteria.

Optionally, processing system 100 may determine several different memory configurations and may assign to each configuration one or more figures of merit (e.g., scale of 1 to 10 rating) that indicates how well each configuration meets the user-specified design criteria. In an advantageous embodiment of the present invention, processing system 100 may also be capable of modifying the object code executed by the target device in order to achieve an optimum solution of memory devices and software that better meets the user-specified design criteria.

Memory 120 stores ASIC application source code file 205, ASIC application object code file 210, compiler program 215, instruction set simulator (ISS) program 220, simulated ASIC memory space 230, debugger program 235, code optimizer program 240, histogram file 250, memory models file 260, and user design criteria file 270, and memory design and optimization program 280. It should be noted that the exemplary programs depicted in memory 120 reflect only one possible logical division of the functions of a memory design tool according to the principles of the present invention. In reality, all or parts of one or more of the exemplary programs may be combined into other programs. For example, compiler program 215 may actually be a "smart" compiler program containing sub-routines that incorporate one or more of instruction set simulator (ISS) program 220, debugger program 235, code optimizer program 240, and memory design and optimization program 280.

ASIC application source code file 205 comprises the proposed source code written by the software designers to operate the target device under design. Processing system 100 executes compiler program 215 in order to compile the source code and produce executable object code that is stored in ASIC application object code file 210.

When the object code is compiled, the system designer may then use processing system 100 to run instruction set simulator (ISS) program 220 on the compiled object code. ISS program 220 simulates the execution of the compiled object code by the target device in simulated ASIC memory space 230. The object code itself is copied into simulated ASIC memory space 230 and all memory access operations (i.e., read operations and write operations) occur within the memory space of simulated ASIC memory space 230. As the execution of the object code is simulated, debugger 235 is capable of working with ISS program 220 to permit the designer to track the simulated execution of the object code.

As the execution of the object code is repeatedly simulated, ISS program 220 monitors all memory access operations and creates in histogram file 250 a plurality of histograms of all memory access operations. These histograms may include, among others, variables histogram file 252, which comprises one or more histograms based on variable names contained in the object code executed by the target device under design, and memory location histogram file 254, which comprises one or more histograms based on memory locations accessed by the object code executed by the target device.

When an initial histogram of the object code has been prepared, the system designer may then use processing system 100 to run memory design and optimization program 280. Memory design and optimization program 280 uses the data in histogram 250, the data in memory models file 260, and the data in user design criteria file 270 to determine the types and amounts of memory that should be used in the target device to best meet the operating parameters specified by the user in user design criteria file 270. In one embodiment of the present invention, the data in user design criteria file 270 may specify general objectives for the target device (i.e., minimize SRAM usage, maximize ROM usage, minimize power consumption, and the like). In alternate embodiments of the present invention, the data in user design criteria file 270 may specify more quantitative objectives for the target device, such as a maximum of N kilobits of SRAM, a maximum of R watts of power consumption, a maximum write operation access speed, and the like.

Table 1 and Table 2 below illustrate exemplary contents of memory models file 260. The data in memory models file 260 specifies the relative performance advantages and disadvantages of a plurality of memory types, including static random access memory (SRAM), dynamic random access memory (DRAM), read-only memory (ROM), flash RAM (FLASH), and electronically erasable programmable read only memory (EEPROM).

TABLE 1

| Memory Type | Write Power | Refresh Power | Read Power | Area Per bit | Write Speed |
|---|---|---|---|---|---|
| SRAM | high | n/a | mid | high | fast |
| DRAM | low | high | mid | low | fast |
| ROM | n/a | n/a | low | low | n/a |
| FLASH | high | n/a | mid | low | slow |
| EEPROM | low | n/a | mid | mid | mid |

TABLE 2

| Memory Type | Read Speed | Erase Capability | Block Size | Area Efficiency |
|---|---|---|---|---|
| SRAM | fast | yes | all | high |
| DPAM | fast | yes | all | low |
| ROM | fast | no | all | mid |
| FLASH | mid | yes | limited | low |
| EEPROM | mid | yes | limited | low |

Given an application to be executed by the target device, memory design and optimization program 280 and code optimizer 240 help the designer select memory sizes and types given the constraints in user design criteria file 270.

In response to the memory configurations and/or figures of merit determined by memory design and optimization program 280, code optimizer 240 may re-order and/or re-write selected portions of the compiled object code in order to achieve greater efficiencies and to better meet the constraints specified in user design criteria 270. For instance, code optimizer 240 and/or memory design and optimization program 280 can modify the object code to store one or more sparsely used variables into an address space that corresponds to a flash memory that is cheaper than SRAM in terms of cell area, but slower in terms of write speed. Also, a variable name that counts errors and that is very infrequently used may be re-written by code optimizer program 240 so that successive writes to the variable can be stored in consecutive memory locations (as opposed to the same one as a standard compiler would do).

Table 3 and Table 4 below illustrate an additional example of a portion of code that has been re-written by code optimizer program 240 to operate in a more efficient manner. For the original code in Table 3, it is assumed that the variable J is changed in the outer loop and is continually read and written from a conventional SRAM.

TABLE 3

```
For (J=0; J<N; J++)
{
    For (I=0; I<M; I++)
    {
        [BLOCK OF EXECUTABLE CODE]
    }
}
```

Code optimizer program 240 creates the new code in Table 4, which makes J into an array in flash RAM that is written and read in consecutive locations:

TABLE 4

```
For (J[mem_access=0] =0; J[mem_access] <N; J[mem_access + 1] =
J[mem_access] +1, mem_access++)
{
        For (I[mem_access1=0] =0; I[mem_access1] <M;
I[mem_access1+1] = I[mem_access1] + 1, mem_access1++)
        {
                [BLOCK OF EXECUTABLE CODE]
        }
}
```

Mem_access and mem_access1 are now stored in the memory controller block, not in SRAM.

Processing systems 100 may also use a software (or hardware) run-time memory manager which can redirect memory accesses to better memory that is available. In the hardware implementation, memory optimization would use a memory interface controller designed to track memory accesses and to reroute the accesses to better utilized blocks of memory to optimize some power or speed constraints. For instance, if an address is not frequently used (as determined by a LRU algorithm), then the memory manager can copy less frequently used data to slower memory with lower power constraints (e.g., DRAM and SRAM mapped variables may instead be stored in flash RAM).

FIG. 3 depicts flow diagram 300, which illustrates the operation of exemplary processing system 100 according to one embodiment of the present invention. Initially, processing system 100 compiles a source code file prepared by the embedded system designer to produce an object code file (process step 305). Then, processing system 100 executes ISS program 220 to simulate the execution of the compiled object code (process step 310). Processing system 100 also runs debugger program 235 in order to debug and edit the object code, if necessary, as it runs (process step 315). As it is executed, ISS program 220 monitors the memory accesses in simulated ASIC memory space 230 and gathers memory usage statistics (process step 320). Simultaneously, ISS program 220 creates or updates the memory access histograms in histogram file 250 (process step 325).

Optionally, processing system 100 may execute code optimizer program 240 in order to modify the object code in response to the histogram data (process step 330). Processing system 100 continues to loop through process steps 310, 315, 320, 325 and 330 until a sufficient number of loops have been performed to ensure that the data in histogram file 250 is an accurate reflection of the real-world memory access usage of the embedded ASIC device being designed. The number of loops may be user-defined or execution of the loop may terminate when the histogram data converges to a reasonably stable value (process step 335).

When a sufficient number of loops have been performed, memory design and optimization program 280 analyzes the histogram data and the user-specified values in user design criteria file 270 and determines one or more memory configurations for the target device that satisfy the user design criteria. Optionally, memory design and optimization program 280 may determine one or more figures of merit for each memory configuration to indicate how well the memory configuration satisfies the user design criteria (process step 340). At this point, processing system 100 may (optionally) execute code optimizer program 240 in order to modify the object code in response to the histogram data, the selected memory configuration, and the figures of merit (process step 345).

Thereafter, processing system 100 may loop back to process step 310 until a sufficient number of loops have been performed to ensure that the data in histogram file 250 is an accurate reflection of the real-world memory access usage of the selected memory configuration. Again, the number of loops may be user-defined or execution of the loop may terminate when the user design criteria are adequately met by one or more of the memory configurations determined by processing system 100 (process step 350).

Although the present invention has been described in detail, those skilled in the art should understand that they can make various changes, substitutions and alterations herein without departing from the spirit and scope of the invention in its broadest form.

What is claimed is:

1. An apparatus for designing a memory configuration for use in an embedded processing system, the apparatus comprising:
   a processing system, the processing system comprising:
   a data processor;
   a simulation controller simulating execution of a program to be executed by said embedded processing system;
   a memory access monitor monitoring memory accesses to a simulated memory space during said simulated execution of said program and concurrently generating memory usage statistical data associated with said monitored memory accesses, and wherein said memory accesses comprise read operations and write operations; and
   a memory optimization controller using said memory usage statistical data, a memory model, and one or more design criteria associated with said embedded processing system determining a plurality of memory configurations satisfying said one or more design criteria and determining a figure of merit for each determined memory configuration, wherein said memory model includes, for each of a plurality of memory types, one or more characteristics selected from write power, refresh power, read power, area per bit, area efficiency, write speed, read speed, erase capability and block size, wherein the figure of merit for each memory configuration indicates a degree to which the respective one of the memory configurations satisfies the one or more design criteria, and wherein said one or more design criteria are selected from memory type usage constraints, memory type size constraints, memory power consumption objectives, and memory speed objectives,
   wherein the memory optimization controller selecting one of the determined memory configurations for use in the embedded processing system to best meet the one or more design criteria; and
   a code optimization controller automatically modifying the program in response to the memory usage statistical data, the selected memory configuration, and the figure of merit for the selected memory configuration to achieve greater efficiencies.

2. The apparatus as set forth in claim 1 wherein each determined memory configuration is determined from a set of memory types, said set of memory types comprising at least two of static random access memory (SRAM), dynamic random access memory (DRAM), read-only memory (ROM), flash RAM (FLASH), and electronically erasable programmable read-only memory (EEPROM).

3. The apparatus as set forth in claim 2 wherein each determined memory configuration comprises a first memory type and a first memory size associated with said first memory type.

4. The apparatus as set forth in claim 3 wherein each determined memory configuration further comprises a second memory type and a second memory size associated with said second memory type.

5. The apparatus as set forth in claim 1 wherein said simulation controller simulates execution of said program N times and wherein said memory access monitor monitors said memory accesses during said N simulated executions of said program and generates said memory usage statistical data based on said N simulated executions of said program.

6. The apparatus of claim 1, wherein the memory usage statistical data comprises at least one of:
one or more first histograms based on variable names contained in the program to be executed by the embedded processing system; and
one or more second histograms based on memory locations accessed by the program to be executed by the embedded processing system.

7. A method of designing a memory configuration for use in an embedded processing system, the method comprising the steps of:
simulating execution of a program to be executed by the embedded processing system;
during the simulated execution of the program, monitoring memory accesses to a simulated memory space, wherein said memory accesses comprise read operations and write operations, and generating memory usage statistical data associated with the monitored memory accesses;
using the memory usage statistical data, a memory model and one or more design criteria associated with the embedded processing system determining a plurality of memory configurations satisfying the one or more design criteria and determining a figure of merit for each determined memory configuration,
wherein the memory model includes, for each of a plurality of memory types, one or more characteristics selected from write power, refresh power, read power, area per bit, area efficiency, write speed, read speed, erase capability and block size, wherein the figure of merit for each determined memory configuration indicates a degree to which the respective one of the determined memory configurations satisfies the one or more design criteria, and wherein the one or more design criteria are selected from memory type usage constraints, memory type size constraints, memory power consumption objectives, and memory speed objectives;
selecting one of the determined memory configurations for use in the embedded processing system to best meet the one or more design criteria; and
automatically modifying the program in response to the memory usage statistical data, the selected memory configuration, and the figure of merit for the selected memory configuration to achieve greater efficiencies.

8. The method as set forth in claim 7 wherein each determined memory configuration is determined from a set of memory types, the set of memory types comprising at least two of static random access memory (SRAM), dynamic random access memory (DRAM), read-only memory (ROM), flash RAM (FLASH), and electronically erasable programmable read-only memory (EEPROM).

9. The method as set forth in claim 8 wherein each determined memory configuration comprises a first memory type and a first memory size associated with the first memory type.

10. The method as set forth in claim 9 wherein each determined memory configuration further comprises a second memory type and a second memory size associated with the second memory type.

11. The method as set forth in claim 7 wherein simulating execution of the program comprises simulating execution of the program N times, wherein monitoring the memory accesses comprises monitoring the memory accesses during the N simulated executions of the program, and wherein generating the memory usage statistical data is based on the N simulated executions of the program.

12. For use in a processing system, a computer-readable storage medium containing computer-executable instructions for designing a memory configuration for use in an embedded processing system, the computer-executable instructions comprising the steps of:
simulating execution of a program to be executed by the embedded processing system;
during the simulated execution of the program, monitoring memory accesses to a simulated memory space, wherein said memory accesses comprise read operations and write operations, and generating memory usage statistical data associated with the monitored memory accesses;
using the memory usage statistical data, a memory model and one or more design criteria associated with the embedded processing system determining a plurality of memory configurations satisfying the one or more design criteria and determining a figure of merit for each determined memory configuration, wherein the memory model includes, for each of a plurality of memory types, one or more characteristics selected from write power, refresh power, read power, area per bit, area efficiency, write speed, read speed, erase capability and block size, wherein the figure of merit for each memory configuration indicates a degree to which the respective one of the memory configurations satisfies the one or more design criteria, and wherein the one or more design criteria are selected from memory type usage constraints, memory type size constraints, memory power consumption objectives, and memory speed objectives;
selecting one of the determined memory configurations for use in the embedded processing system to best meet the one or more design criteria; and
automatically modifying the program in response to the memory usage statistical data, the selected memory configuration, and the figure of merit for the selected memory configuration to achieve greater efficiencies.

13. The computer-readable storage medium as set forth in claim 12 wherein each determined memory configuration is determined from a set of memory types, the set of memory types comprising at least two of static random access memory (SRAM), dynamic random access memory (DRAM), read-only memory (ROM), flash RAM (FLASH), and electronically erasable programmable read-only memory (EEPROM).

14. The computer-readable storage medium as set forth in claim 13 wherein each determined memory configuration comprises a first memory type and a first memory size associated with the first memory type.

15. The computer-readable storage medium as set forth in claim 14 wherein each determined memory configuration further comprises a second memory type and a second memory size associated with the second memory type.

16. The computer-readable storage medium as set forth in claim 12 wherein simulating execution of the program comprises simulating execution of the program N times, wherein monitoring the memory accesses comprises monitoring the memory accesses during the N simulated executions of the program, and wherein generating the memory usage statistical data is based on the N simulated executions of the program.

* * * * *